US008255390B2

(12) United States Patent
Inagaki et al.

(10) Patent No.: US 8,255,390 B2
(45) Date of Patent: Aug. 28, 2012

(54) SESSION BASED CLICK FEATURES FOR RECENCY RANKING

(75) Inventors: Yoshiyuki Inagaki, Sunnyvale, CA (US); Narayanan Sadagopan, Sunnyvale, CA (US); Georges-Eric Albert Marie Robert Dupret, Mountain View, CA (US); Ciya Liao, Fremont, CA (US); Anlei Dong, Fremont, CA (US); Yi Chang, Santa Clara, CA (US); Zhaohui Zheng, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 374 days.

(21) Appl. No.: 12/725,310

(22) Filed: Mar. 16, 2010

(65) Prior Publication Data

US 2011/0231390 A1 Sep. 22, 2011

(51) Int. Cl.
*G06F 7/00* (2006.01)
*G06F 17/30* (2006.01)
(52) U.S. Cl. .................. 707/722; 707/725; 707/727
(58) Field of Classification Search .............. 707/722, 707/725, 727, 705, 721, 999.003
See application file for complete search history.

(56) References Cited

U.S. PATENT DOCUMENTS

| | | | | |
|---|---|---|---|---|
| 7,890,850 | B1 * | 2/2011 | Bryar et al. ............... | 715/200 |
| 7,996,349 | B2 * | 8/2011 | Dasdan et al. ............. | 706/46 |
| 8,019,708 | B2 * | 9/2011 | Dasdan et al. ............. | 370/252 |
| 8,066,565 | B2 * | 11/2011 | Fotevski ................... | 707/942 |

OTHER PUBLICATIONS

Agichtein, E. et al., "Improving Web Search Ranking by Incorporating User Behavior Information," *SIGIR* '06, 2006.
Berberich, K. et al., "Time-Aware Authority Ranking," *Internet Mathematics* 2(3) 301-332, 2004.
Boldi, P. et al., "The query-flow graph: model and applications," *Proceedings of the ACM Conference on Information and Knowledge Management(CIKM)*, 2008.
Burges, C. et al., "Learning to rank using gradient descent," *Proc. of Intl. Conf on Machine Learning*, 2005.
Cao, Y. et al., "Adapting Ranking SVM to Document Retrieval," *SIGIR* '06, 2006.
Diaz, F. "Integration of news content into web results," *Proceedings of the Second ACM International Conference on Web Search and Data Mining (WSDM)*, 182-191, 2009.
Dong, A. et al., "Towards recency ranking in web search" *WSDM* '10, 2010.

(Continued)

*Primary Examiner* — Vincent Boccio
(74) *Attorney, Agent, or Firm* — SNR Denton US LLP

(57) ABSTRACT

In one embodiment, access one or more query-resource pairs, wherein for each one of the query-resource pairs comprising one of one or more search queries and one of one or more network resources, the one search query is recency-sensitive with respect to a particular time period, and the one network resource is identified for the one search query, and a resource-view count and a resource-click count associated with each one of the query-resource pairs; and construct one or more first click features using the resource-view counts and the resource-click counts associated with the query-resource pairs. To construct one of the first click features in connection with one of the query-resource pairs comprises determine a only-resource-click count associated with the one query-resource pair; and calculate a ratio between the only-resource-click count and the resource-view count associated with the one query-resource pair as the one first click feature.

21 Claims, 4 Drawing Sheets

OTHER PUBLICATIONS

Freund, Y. et al., "An Efficient Boosting Algorithm for Combining Preferences," *Journal of Machine Learning Research 4*, 933-969, 2003.

Gao, J. et al., "Smoothing Clickthrough Data for Web Search Ranking," *SIGIR'09*, 2009.

He, D. et al., "Detecting session boundaries from web user logs," *Proceedings of the BCS-IRSG 22nd annual colloquium on information retrieval research*, 2000.

He, D. et al., "Combining evidence for automatic web session identification," *Inf. Process. Manage* 38(5):727-742, 2002.

Järvelin, K. et al, "Cumulated gain-based evaluation of IR techniques," *ACM Transactions on Information Systems*, 20:422-446, 2002.

Joachims, T. "Optimizing search engines using clickthrough data," *Proc. of ACM SIGKDD Conference*, 2002.

Jones, R. et al., "Beyond the session timeout: Automatic hierarchical segmentation of search topics in query logs," *Proceedings of the ACM Conference on Information and Knowledge Management (CIKM '08)*, 2008.

Radlinski, F. et al., "Query chains: Learning to rank from implicit feedback," *ACM SIGKDD International Conference on Knowledge Discovery and Data Mining (KDD '05)*, 2005.

Zhang, R. et al., "Search result re-ranking by feedback control adjustment for time-sensitive query," *North American Chapter of the Association for Computational Linguistics—Human Language Technologies (NAACL HLT)*, 2009.

Zheng, Z. et al. "A general boosting method and its application to learning ranking functions for web search," *NIPS*, 2007.

\* cited by examiner

← 100

← 110

112 —
George Washington - Wikipedia, the free encyclopedia

114 — George Washington was the leader of the Continental Army in the American Revolutionary War (1775–1783) and served as the first President of the United States of America (1789–1797).

116 — en.wikipedia.org/wiki/George_Washington - 257k - Cached

← 120

122 —
Biography of George Washington

124 — WhiteHouse.gov is the official web site for the White House and President Barack Obama, the 44th President of the United States. This site is a source for 126 — ...
www.whitehouse.gov/about/presidents/georgewashington - 54k - Cached

← 130

132 —
George Washington: Biography from Answers.com

134 — George Washington , U.S. President / Military Leader / Revolutionary War Figure Born: 22 February 1732 Birthplace: Westmoreland County, Virginia 136 — Died:
www.answers.com/topic/george-washington - 480k - Cached

← 140

142 —
President George Washington

144 — US Presidential Trivia for fun and learning. The site also has lesson ideas and activities for K-12 students. This page features George Washington.

146 — www.classroomhelp.com/lessons/Presidents/washington.html - Cached

← 150

152 —
American President: George Washington

154 — In-depth essays created by the University of Virginia on George Washington's life and administration. ... George Washington. At a Glance. Term: 1st President 156 — ...
millercenter.org/academic/americanpresident/washington - Cached

FIGURE 1 (PRIOR ART)

SESSION BASED CLICK FEATURES FOR RECENCY RANKING

TECHNICAL FIELD

The present disclosure generally relates to improving the quality of search results constructed by search engines and more specifically relates to extracting click features that may be used to train a recency ranking algorithm.

BACKGROUND

The Internet provides a vast amount of information. The individual pieces of information are often referred to as "network resources" or "network contents" and may have various formats, such as, for example and without limitation, texts, audios, videos, images, web pages, documents, executables, etc. The network resources or contents are stored at many different sites, such as on computers and servers, in databases, etc., around the world. These different sites are communicatively linked to the Internet through various network infrastructures. Any person may access the publicly available network resources or contents via a suitable network device (e.g., a computer, a smart mobile telephone, etc.) connected to the Internet.

However, due to the sheer amount of information available on the Internet, it is impractical as well as impossible for a person (e.g., a network user) to manually search throughout the Internet for specific pieces of information. Instead, most network users rely on different types of computer-implemented tools to help them locate the desired network resources or contents. One of the most commonly and widely used computer-implemented tools is a search engine, such as the search engines provided by Microsoft® Inc. (http://www.bing.com), Yahoo!® Inc. (http://search.yahoo.com), and Google™ Inc. (http://www.google.com). To search for information relating to a specific subject matter or topic on the Internet, a network user typically provides a short phrase or a few keywords describing the subject matter, often referred to as a "search query" or simply "query", to a search engine. The search engine conducts a search based on the search query using various search algorithms and generates a search result that identifies network resources or contents that are most likely to be related to the search query. The network resources or contents are presented to the network user, often in the form of a list of links, each link being associated with a different network document (e.g., a web page) that contains some of the identified network resources or contents. In particular embodiments, each link is in the form of a Uniform Resource Locator (URL) that specifies where the corresponding document is located and the mechanism for retrieving it. The network user is then able to click on the URL links to view the specific network resources or contents contained in the corresponding document as he wishes.

Sophisticated search engines implement many other functionalities in addition to merely identifying the network resources or contents as a part of the search process. For example, a search engine usually ranks the identified network resources or contents according to their relative degrees of relevance with respect to the search query, such that the network resources or contents that are relatively more relevant to the search query are ranked higher and consequently are presented to the network user before the network resources or contents that are relatively less relevant to the search query. The search engine may also provide a short summary of each of the identified network resources or contents.

There are continuous efforts to improve the qualities of the search results generated by the search engines. Accuracy, completeness, presentation order, and speed are but a few of the performance aspects of the search engines for improvement.

SUMMARY

The present disclosure generally relates to improving the quality of search results constructed by search engines and more specifically relates to extracting click features that may be used to train a recency ranking algorithm.

Particular embodiments access: (1) one or more query-resource pairs, wherein for each one of the query-resource pairs comprising one of one or more search queries and one of one or more network resources, the one search query is recency-sensitive with respect to a particular time period, and the one network resource is identified for the one search query; (2) a resource-view count associated with each one of the query-resource pairs, wherein for each one of the query-resource pairs, the resource-view count is a number of search sessions during which one of one or more network users has viewed the one network resource in connection with the one search query; and (3) a resource-click count associated with each one of the query-resource pairs, wherein for each one of the query-resource pairs, the resource-click count is a number of search sessions during which one of the network users has clicked on the one network resource in connection with the one search query. Particular embodiments construct one or more first click features using the resource-view counts and the resource-click counts associated with the query-resource pairs. To construct one of the first click features in connection with one of the query-resource pairs, particular embodiments determine a only-resource-click count associated with the one query-resource pair using the resource-click count associated with the one query-resource pair, wherein the only-resource-click count is a number of search sessions during which one of the network users has clicked only on the one network resource and none of other ones of the network resources in connection with the one search query; and calculate a ratio between the only-resource-click count and the resource-view count associated with the one query-resource pair as the one first click feature.

These and other features, aspects, and advantages of the disclosure are described in more detail below in the detailed description and in conjunction with the following figures.

BRIEF DESCRIPTION OF THE DRAWINGS

FIG. 1 (prior art) illustrates an example search result.

DETAILED DESCRIPTION

Figure 2:
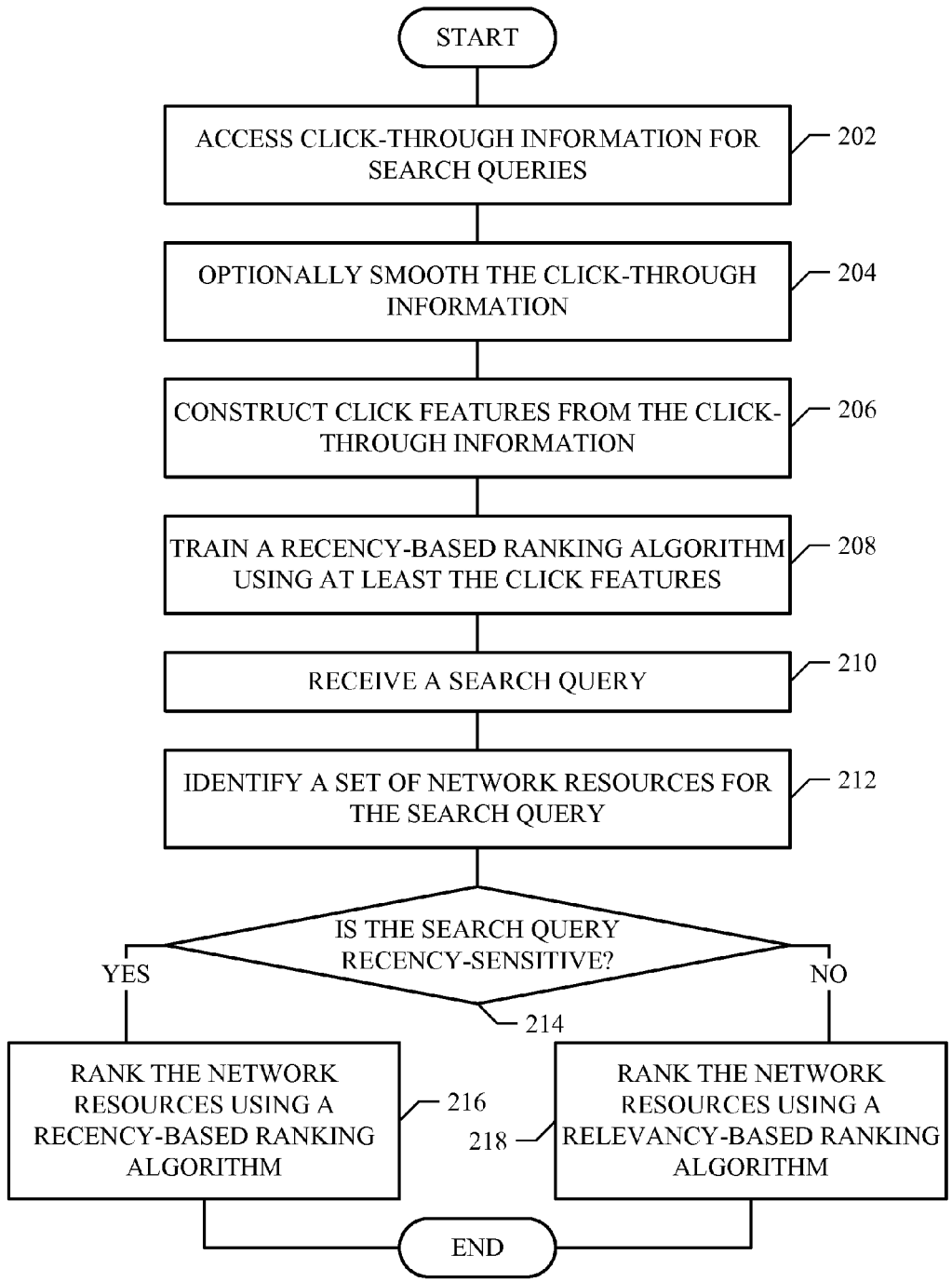
FIG. 2 illustrates an example method for constructing click features for training a recency-based ranking algorithm.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A search engine is a computer-implemented tool designed to search for information relevant to specific subject matters or topics on a network, such as the Internet, the World Wide Web, or an Intranet. To conduct a search, a network user may issue a search query to the search engine. The search query generally contains one or more words that describe a subject matter of interest. In response, the search engine may identify one or more network resources that are likely to be related to the search query, which may collectively be referred to as a "search result" identified for the search query.

Sophisticated search engines implement many other functionalities in addition to merely identifying the network resources as a part of the search process. For example, a search engine usually ranks the network resources identified for a search query according to their relative degrees of relevance with respect to the search query, such that the network resources that are relatively more relevant to the search query are ranked higher and consequently are presented to the network user before the network resources that are relatively less relevant to the search query. The search engine may also provide a short summary of each of the identified network resources.

FIG. 1 illustrates an example search result 100 that identifies five network resources and more specifically, five web pages 110, 120, 130, 140, 150. Search result 100 is constructed in response to an example search query "President George Washington". Note that only five network resources are illustrated in order to simplify the discussion. In practice, a search result may identify hundreds, thousands, or even millions of network resources. Network resources 110, 120, 130, 140, 150 each includes a title 112, 122, 132, 142, 152, a short summary 114, 124, 134, 144, 154 that briefly describes the respective network resource, and a clickable link 116, 126, 136, 146, 156 in the form of a URL. For example, network resource 110 is a web page provided by WIKIPEDIA that contains information concerning George Washington. The URL of this particular web page is "en.wikipedia.org/wiki/George_Washington".

Network resources 110, 120, 130, 140, 150 are presented according to their relative degrees of relevance to search query "President George Washington". That is, network resource 110 is considered somewhat more relevant to search query "President George Washington" than network resource 120, which is in turn considered somewhat more relevant than network resource 130, and so on. Consequently, network resource 110 is presented first (i.e., at the top of search result 100) followed by network resource 120, network resource 130, and so on. To view any of network resource 110, 120, 130, 140, 150, the network user requesting the search may click on the individual URLs of the specific web pages.

In certain cases, the ranking of the network resources with respect to the search queries may be determined by a ranking algorithm implemented by the search engine. Given a search query and a set of network resources identified in response to the search query, the ranking algorithm ranks the network resources in the set according to their relative degrees of relevance with respect to the search query. That is, given a search query and a network resource, the ranking algorithm mainly considers how closely the content of the network resource relates to the subject matter described by the search query. More specifically, in certain cases, the network resources that are relatively more relevant to the search query are ranked higher than the network resources that are relatively less relevant to the search query, as illustrated, for example, in FIG. 1. In certain cases, as a part of the ranking process, the ranking algorithm may determine a ranking score for each of the network resources in the set. For example, the network resources that are relatively more relevant to the search query may receive relatively higher ranking scores than the network resources that are relatively less relevant to the search query. The network resources in the set are then ranked according to their respective ranking scores. Because such a ranking algorithm ranks the network resources identified for a search query mainly according to their relative degrees of relevance with respect to the search query, the ranking algorithm may be referred to as a "relevancy-based" ranking algorithm.

Sometimes, a search query may describe a subject matter that has little or no connection with time. For example, search queries such as "President George Washington", "French red wine", or "Italian restaurants in San Francisco" describe subject matters that are continuously present with little or no change over time, and therefore are not time sensitive or time specific (i.e., time insensitive). A relevancy-based ranking algorithm may be well suitable for ranking a set of network resources with respect to such a search query that has little or no connection with time. Sometimes, however, a search query may describe a subject matter that has a time aspect associated with it. That is, the search query may have a strong connection with time or with a specific time period Such search queries may be referred to as "recency-sensitive" or "time-sensitive" search queries. Search queries relating to breaking news, trendy topics, or popular gossips are examples of the recency-sensitive search queries. For example, search query "Hurricane Katrina" may be considered recency-sensitive around August and September of 2005; search queries "presidential election", "democratic primary", or "Barack Obama" may be considered recency-sensitive between late 2007 and early 2008; and search queries "Haiti earthquake" or "Haitian victim names" may be considered recency-sensitive around January and February of 2010. Furthermore, these search queries may be only recency-sensitive during specific time periods, as suggested by the above example recency-sensitive search queries. Once a particular time period has passed, a search query may no longer be considered recency-sensitive. For example, search queries "presidential election" and "democratic primary" may no longer be considered recency-sensitive after November 2008.

When ranking the network resources identified for a recency-sensitive search query, it may be important to take into consideration the recency of the network resources identified for the recency-sensitive search query as well as their topic relevance. The recency of a network resource may indicate the "freshness" of the network resource (i.e., how recent or how up-to-date the network resource or the content of the network resource is, especially with respect to the search query to which the network resource corresponds), such as, for example and without limitation, when is the network resource created and published, when is the network resource last updated or modified, when is the network resource included as a link in anther network resource, when is the network resource discovered by a search engine, etc. For example, when a network user issues the search query "Haiti earthquake" to a search engine, it is most likely that the network user wishes to locate the latest information or news on the Haiti earthquake. Therefore, it is most likely that the network user may find a news article that has just been published within the past few hours, which contains the latest information available on the Haiti earthquake, more suitable to his informational needs than a news article that has been published more than a week ago.

A ranking algorithm that takes into consideration the recency as well as the relevancy of the network resources when ranking them for a search query may be referred to as a "recency-based" ranking algorithm. In particular embodiments, a recency-based ranking algorithm may be used to rank network resources identified for recency-sensitive search queries, either by itself or in connection with a relevancy-based ranking algorithm. If the recency-based ranking algorithm is used by itself, it may replace the relevancy-based ranking algorithm whenever a search result needs to be constructed for a recency-sensitive search query. If the recency-based ranking algorithm is used in connection with a relevancy-based ranking algorithm, the two ranking algorithms may together produce a final ranking result for a set of network resources identified for a recency-sensitive search query.

In particular embodiments, a recency-based ranking algorithm may be trained via machine learning using a set of training features. Machine learning is a scientific discipline that is concerned with the design and development of algorithms that allow computers to learn based on data. The computational analysis of machine learning algorithms and their performance is a branch of theoretical computer science known as computational learning theory. The desired goal is to improve the algorithms through experience (e.g., by applying the data to the algorithms in order to "train" the algorithms). The data are thus often referred to as "training data". In the field of search engines and with respect to the present disclosure, machine learning is the process of training computers to learn to perform certain functionalities, and more specifically, to perform ranking on the network resources with respect to the individual search queries.

A machine learning algorithm may be organized into a taxonomy based on the desired outcome of the algorithm. Examples of algorithm types may include supervised learning, unsupervised learning, semi-supervised learning, reinforcement learning, transduction, and learning to learn. One type of algorithm of machine learning is transduction, also known as transductive inference. Typically, such an algorithm may predict an output in response to an input. To train such an algorithm, for example, the training data may include training inputs and training outputs. The training outputs may be the desirable or correct outputs that should be predicted by the algorithm given the training inputs. By comparing the outputs actually predicted by the algorithm in response to the training inputs with the training outputs, the algorithm may be appropriately adjusted and improved so that, in response to the training inputs, the algorithm predicts outputs that are the same as or similar to the training outputs. In particular embodiments, the type of training inputs and training outputs in the training data may be similar to the type of actual inputs and actual outputs to which the algorithm is to be applied. Often, multiple sets of training data may be applied to the same algorithm so that the algorithm may be repeatedly improved.

There may be many types of features that may be used to train a recency-based ranking algorithm, such as, for example and without limitation, recency features, click features, or relevancy features. Particular embodiments contemplate any suitable type of training features. Once a recency-based ranking algorithm has been adequately trained, it may then be used to rank the network resources identified for the recency-sensitive search queries. Because the recency-based ranking algorithm has been trained with the recency features in addition to the other types of features, the recency-based ranking algorithm in effect takes into consideration the recency of the network resources and optionally other factors represented by the other types of features during the ranking process.

Particular embodiments may include various click features as a part of the training features that may be used to train a recency-based ranking algorithm. FIG. 2 illustrates an example method for constructing click features for training a recency-based ranking algorithm. Particular embodiments may construct click features based on the click-through information for individual search queries (step 202). Such click-through information may be collected from various sources. For example, each search engine may maintain logs that record the search-related activities occurring at the search engine, such as the search queries received by the search engine, the time at which each search query is received at the search engine, the network resources identified for each search query and their ranking, the network resources clicked by the users requesting the searches, and so on. The click-through information may be extracted from the information stored in these logs.

Hereafter, let q denote a search query, url denote a network resource (i.e., each network resource is referenced by its unique URL), and $t_q$ denote the time q is issued to or received at a search engine. Thus, for each search query, q, the search engine may identify one or more network resources, $url_1, \ldots, url_n$, where n may be any positive integer. Furthermore, for each search query, q, there may be one or more query-resource pairs, and each query-resource pair may be denoted as a tuple ⟨q, url⟩. Many such query-resource pairs may be extracted from the information stored in the logs maintained by the search engines. Furthermore, based on the click-through information, particular embodiments may determine, for each one of the query-resource pairs, whether the network resource has been clicked in connection with the search query by a network user during a search session. In particular embodiments, a search session may be loosely defined as a series of interactive and somewhat continuous information exchange between a search engine and a network device associated with a network user that lasts some period of time. During a search session, the network user may, through his network device, issue one or more search queries to the search engine; and in response, the search engine may construct one or more search results and transmit them to the network device for presentation to the network user. The network user may also exam, click on, and view any of the network resources included in any of the search results. The click features used to train a recency-based ranking algorithm may be constructed from these query-resource pairs together with their associated click-through information.

In particular embodiments, collecting training data for recency-based ranking algorithms differs from collecting training data for relevancy-based ranking algorithms. With relevancy-based ranking algorithms, the relevance judgment for each query-resource pair, ⟨q, url⟩, is usually static over time because resource freshness generally does not affect the user satisfaction over the network resources identified for a search query. The judgment for a recency-sensitive query-resource pair, however, needs to incorporate the freshness of the network resource. Thus, with recency-based ranking algorithms, the time that the search query is issued, $t_q$, needs to be incorporated into each query-resource pair. Consequently, each query-resource pair is represented by the tuple ⟨q, url, $t_q$⟩. Moreover, because the click features constructed based on these query-resource pairs are used to train a recency-based ranking algorithm, which is especially suited to rank the network resources identified for the time-sensitive search queries, the search queries in the query-resource pairs, in particular embodiments, are themselves time-sensitive search queries in order to yield suitable and meaningful training data.

In particular embodiments, for the purpose of constructing training features for a recency-based ranking algorithm, each query-resource pair may receive a human judgment on how good the network resource is with respect to the search query. Whether a network resource is "good" or "bad" with respect to a search query may depend on many factors, including the relevancy and recency of the network resource. In particular embodiments, five judgment grades may be used to label a query-resource pair: perfect, excellent, good, fair, and bad. Each query-resource pair may received one of the five grades, given by a human judge, indicating how good the network resource is with respect to the search query. Furthermore, because of the time sensitivity associated with the recency-sensitive search queries, particular embodiments may periodically collect sets of query-resource pairs used for constructing the training features, as opposed to collecting all training sets of query-resource pairs at once, and have them judged by human judges immediately or shortly after they are collected so that the human judges may make relatively reliable judgment. The goal is to bring the human judging time, $t_j$, as closely as possible to the query issue time, $t_q$, for each query-resource pair used to construct the training features.

In particular embodiments, a human judge may judge a query-resource pair using a two-step process. First, a grade is determined for the query-resource pair based on non-temporal relevance, such as, for example and without limitation, intent, usefulness, content, user interface design, domain authority, etc. Then, the initial grade is adjusted solely based on the recency of the network resource, such that the query-resource pair should receive a grade demotion if the date of the network resource or the age of the content of the network resource makes the network resource less relevant in comparison to more recent material or the changes in time alter the context of the search query. For example, the grade demotion may reflect the following judgment options: (1) shallow demotion (one-grade demotion), if the network resource is somewhat outdated; and (2) deep demotion (two-grade demotion), if the network resource is completely outdated or useless. Such recency-demotion grading method has several advantages. For example, first, recency is incorporated into the modeling of the ranking problem; and second, recency may also be decoupled from the overall relevance so that recency and non-recency relevance may be analyzed separately during training of the recency-based ranking algorithm.

When a set of network resources is presented to a network user in response to the network user issuing a search query to a search engine, the network user may choose to click on the URLs of some of the network resources in order to view the content of these network resources in more detail. Such user behavior may suggest that, with respect to the corresponding search query, a network resource that has received a user click is more likely to satisfy the user's informational needs than a network resource that has not received any user click. Consequently, the network resource that has received a user click may be considered a "better" network resource with respect to the corresponding search query than the network resource that has not received any user click. The search engine may record in its logs which network resources have been clicked by network users in response to which search queries. Particular embodiments may extract such click-through information from the logs.

Particular embodiments may optionally smooth the click-through information (step 204). Smoothing is described in more detail below. Particular embodiments may construct one or more click features based on either the unsmoothed or the smoothed click-through information (step 206).

In particular embodiments, a first type of click features that may be included as a part of the training data for training a recency-based ranking algorithm is the click-through rate (CTR) of the individual query-resource pairs. The CTR of a network resource, in general, may be obtained by dividing the number of times the network resource has been clicked by the network users by the number of times the network resource has been presented to the network users. In particular embodiments, the CTR of a query-resource pair, CTR(q, url), may be defined as the ratio between the number of search sessions with clicks on the given network resource for the given search query and the total number of search sessions during which the network resource is viewed for the search query (i.e., the number of search sessions during which the network resource is presented to the network user issuing the search query). In particular embodiments, CTR(q, url) may be computed as:

$$CTR(q, url) = \frac{\sum_{i=1}^{T} c_i}{\sum_{i=1}^{T} v_i};$$

where: T is the time period spanning one or more days during which viewing and clicking information concerning the query-resource pair, $\langle q, url \rangle$, is collected; $c_i$ is the number of times url is clicked by network users in connection with q on day i; and $v_i$ is the number of times url is viewed by network users in connection with q on day i.

Typically, a search result constructed for a search query may include a large number of network resources. When these network resources are presented to the network user requesting the search, they may need to be divided into multiple web pages. Initially, the first web page is presented to the network user that may include a limited number (e.g., 20 or 30) of the highest-ranking network resources. If the network user wishes to view more and gradually lower-ranking network resources, the network user may click on a link in the web page to each of the subsequent web pages containing the network resources. Particular embodiments may assume that all the network resources included in the first web page for a search query are viewed by the network user. Furthermore, if the network user requests a subsequent web page, particular embodiments may assume that all the network resources included in the subsequent web page are also viewed by the network user.

In particular embodiments, a second type of click features that may be included as a part of the training data for training a recency-based ranking algorithm is the only click-through rate (OCTR) of the individual query-resource pairs. In particular embodiments, the OCTR of a query-resource pair, $CTR_O(q, url)$, may be defined as the ratio between the number of search sessions during which a network user has clicked only on the given network resource and nothing else for the given search query and the total number of search sessions during which the network resource is viewed for the search query (i.e., the number of search sessions during which the network resource is presented to the network user issuing the search query). For example, consider the example search query "Haiti earthquake". When this search query is issued to a search engine (e.g., http://search.yahoo.com), the corresponding search result may include many news articles posted at different websites, such as CNN, Yahoo! News, BBC, CBS, USA Today, etc. If, among all the network resources presented to the network user issuing the example search query to the search engine, the network user only clicks on the one news article posted at the CNN website, then this CNN news article may be considered to have an "only click-through" for example search query "Haiti earthquake" during this search session. If, on the other hand, the network user clicks on two or more of the network resources, then none of the network resources has an "only click-through" for example search query "Haiti earthquake" during this search session.

In particular embodiments, a third type of click features that may be included as a part of the training data for training a recency-based ranking algorithm is the click attractivity (ATTR) of the individual query-resource pairs. In particular embodiments, the ATTR of a query-resource pair, ATTR(q, url), may be defined as the ratio between the number of search sessions with clicks on the given network resource for the given search query and the total number of search sessions during which the network resource is either clicked or examined. Particular embodiments may assume that if a network resource ranks above any other network resource that has been clicked in a search session, then the network resource is considered to have been examined. For example, suppose for the example search query "Haiti earthquake", the network user has clicked on the fifth-ranking network resource in the search result. Even though the network user has not clicked on the first four ranking network resources, the first four ranking network resources may be assumed to have been examined by the network user. If the network user has clicked on the tenth-ranking network resource in the search result, then the first nine ranking network resources may be assumed to have been examined by the network user.

Although the above click features are described with respect to query-resource pairs, the similar concept may be applied to query-host pairs, such that various types of click features may be constructed for individual query-host pairs and included in the training data for training a recency-based ranking algorithm. In particular embodiment, a host, or more precisely, a network host, is a computing system connected to a network that may host information resources as swell as application software for providing network services. For each query-host pair, the network host may host one or more of the network resources identified for the search query. For example the click features with respect to a query-host pair, $\langle q, h \rangle$, may include CTRH(q, h) (the click-through rate for a query-host pair), CTRH$_O$(q, h) (the only click-through rate for a query-host pair), and ATTRH(q, h) (the click attractivity for a query-host pair).

In particular embodiments, a time varying CTR with a weighting strategy may be applied to each one of the above click features. That is, the traditional CTR is weighted by time. In particular embodiments, click and view counts for a day may be exponentially weighted to emphasize recent observations (i.e., click-through information collected more recently weigh more than click-through information collected further in the past). Particular embodiments may compute the weighted CTR, $CTR^w(q, url, t_q)$, as:

$$CTR^w(q, url, t_q) = \frac{\sum_{i=1, v_i>0}^{t_q} c_i \times (1+x)^{i-t_q}}{\sum_{i=1, v_i>0}^{t_q} v_i \times (1+x)^{i-t_q}}.$$

When $x=0$, $CTR^w=CTR$, which is the traditional un-weighted click-through rate. Thus, particular embodiments may vary the value of x to control how steep to over-emphasize the more recent observations. That is, the value of x controls the exponential decay of the older observations. Particular embodiments may choose a value for x based on experiments. For example, the value of x may reasonably range between 0 and 5 in practice. The term $i-t_q$ indicates how many days the data is from $t_q$, and the higher the value, the order the data.

The same time-varying weighting strategy may be applied to the click-through rate for a query-host pair, $CTRH^w$, the only click-through rate for a query-resource pair, $CTR_O^w$, or a query-host pair, $CTRH_O^w$, and the click attractivity for a query-resource pair, $ATTR^w$, or a query-host pair, $ATTRH^w$.

In particular embodiments, a fourth type of click features that may be included as a part of the training data for training a recency-based ranking algorithm is the click buzz of a network resource, a website, or a host, which identifies whether the network resource, the website, or the host receives an unusual level of attention from the network users during a current time period in comparison to the past. Particular embodiments may measure user attention as the number of clicks on the network resource, the website, or the host, or the number of clicks on the query-resource pair, or the query-host pair, and so on. Using the number of clicks on a query-resource pair as an example, let $c_t$ denote the number of clicks on the network resource in connection with the search query during a particular time interval, t. Particular embodiments may compute the average of the number of clicks during the time period T as:

$$\bar{c}_T = \frac{1}{T}\sum_{t=1}^{T} c_t;$$

where T is again the time period spanning one or more time intervals during which the click-through information is collected. The variance of the number of clicks during the time period T may be computed as:

$$VAR(c) = \sigma_T^2(c) = \frac{1}{T}\sum_{t=1}^{T}(c_t - \bar{c}_T)^2.$$

Particular embodiments may then define the buzz feature for a query-resource pair as the deviation from the empirical average of the number of clicks on the network resource in connection with the search query over a specific period of time, normalized by the standard deviation over the same time period. It is therefore a measure of how atypical the feature value (i.e., the number of clicks on a network resource in connection with a search query) is on a given time interval (e.g., a day), compared with the corresponding average feature value. Particular embodiments may compute the buzz feature as:

$$b(q, url, t_q) = \frac{c_{t_q} - \hat{c}_{1:t_q}}{\hat{\sigma}(c_{1:t_q})}.$$

Particular embodiments may compute the buzz value of any feature varying over time, such as, for example and without limitation, the number of host-clicks or website clicks, the number of times a query is issued, etc.

Note that for the above click features, the feature values for a given tuple $\langle q, url, t_q \rangle$ are computed using only the click-through information up till $t_q$ (i.e., the time the search query is issued to a search engine). These click features favor network resources that have been of recent interest for a search query.

Because the click features are used to train a recency-based ranking algorithm, particular embodiments construct them from the query-resource pairs where the search queries are time sensitive. The time-sensitive query-resource pairs and their associated click-through information may be exacted from the information stored in the logs maintained by the search engines. However, in practice, among all the search queries issued to a search engine, only a relatively small percentage is time sensitive. As a result, the number of time-sensitive query-resource pairs that may be extracted from the logs is relatively small. This means that the click features are constructed from a relatively small set of training query-resource pairs, which may result in the click features having relatively low quality. Training a ranking algorithm using lower quality features often results in the ranking algorithm having lower quality performance. To improve the quality of the click features, particular embodiments need to increase the number of time-sensitive query-resource pairs having associated click-through information, which may be used to construct the click features.

Another challenge in recency ranking is to model changes in the query intent. Looking at query reformulations may be a valuable source of information for this purpose. In most analysis of network search relevance, a single search query may be considered the base unit of user interaction with a search engine. However, a network user often issues multiple search queries to a search engine when the network user wishes to locate information concerning a particular subject matter. For example, a network user may issue a first search query, exam the first search result constructed for the first search query, reformulate the words in the search query and issue a second search query, exam the second search result constructed for the second search query, and so on, repeating the process until the network user has located sufficient information to satisfy his informational needs. In this sense, the network user has used a chain of search queries all relating to the same subject matter, and may be gradually refine or reformulate each successive search query in the chain in order to locate the desired information. Hereafter, let $Q=\{q_1, \ldots, q_n\}$ denote a chain of search queries all relating to the same subject matter and issued by the same network user during a search session, where $n \geq 2$. Furthermore, $q_2$ is issued to the search engine after $q_1$, $q_3$ is issued to the search engine after $q_2$, and so on, and $q_n$ is issued to the search engine after $q_{n-1}$. That is, there is a timing order associated with the search queries in a query chain.

For each of the search queries in the chain, a search result, $r=\{url_1, \ldots, url_m\}$, may be constructed that includes one or more network resources. Let $r_1$ be the search result for $q_1$, $r_2$ be the search result for $q_2$, and so on. Thus, generally, $r_i$ be the search result for $q_1$, where $1 \leq i \leq n$. Of course, a single network resource may be included in multiple search results.

When the network user examines each particular search result, he may click on one or more of the network resources included therein or he may not click on any of the network resources included therein before proceeding to the next search query in the query chain. Particular embodiments may apply a smoothing algorithm to the click-through information associated with a query chain (step 204). If a network resource, $url_j$, has been clicked by the network user for a particular search query, $q_i$, in the query chain Q, where $2 \leq i \leq n$, then particular embodiments presumes that $url_j$ has been clicked for each of the search queries in Q before $q_i$. That is, particular embodiments presumes that $url_j$ has been clicked for each of $q_1, \ldots, q_{i-1}$, even though the network user may not have actually clicked $url_j$ for any of $q_1, \ldots, q_{i-1}$. In a more specialized case, particular embodiments may only presume that $url_j$ has been clicked for the first search query, $q_i$, in Q. The process of presuming (i.e., attributing) clicks on network resources for one search query in the query chain to another search query previously in the query chain may be referred to as "smoothing".

Consider a query chain example. On Nov. 28, 2008, Britney Spears released her new album called "Circus". Query logs maintained by a search engine shows that the search query "Circus" became popular a few days later (i.e., many network users issued search query "Circus" to the search engine). About the same time, network resources about Britney Spears' Circus album started to be viewed and clicked more frequently. However, the word "circus" has multiple meanings Thus, using only the word "circus" as a search query may not result in the right network resources that contain information on Britney Spears' Circus album being located.

Since network users could not get the network resources about Britney Spears' Circus album with the search query "Circus", they issued a series of search queries, including "Circus album" and "Britney Spears Circus album" by refining the previous search queries until they located the network resources about the album and clicked on the URLs of those network resources. In this example, the series of search queries to retrieve the network resources about the album (e.g., "Circus", "Circus album", and "Britney Spears Circus album", in that order) constitute one query chain. The goal of the network users is to obtain results for Britney Spears' Circus album. The network resources clicked by the network users for search query "Britney Spears Circus album" may be presumed to have been clicked for search queries "Circus" or "Circus album"; and the network resources clicked by the network users for search query "Circus album" be presumed to have been clicked for search query "Circus".

Consider two search queries, $q_i$ and $q_j$, in a query chain, where $q_j$ is issued to a search engine after $q_i$; that is $i<j$. In particular embodiments, if a network resource, $url_k$, identified for $q_j$ has actually been clicked in connection with $q_j$ by the network user issuing the two search queries to the search engine, then smoothing the query chain may result in $url_k$ being presumed to have been clicked in connection with $q_i$. In particular embodiments, there may be two query-resource pairs, $\langle q_i, url_k \rangle$ and $\langle q_j, url_k \rangle$, as a result of smoothing the query chain. With $\langle q_i, url_k \rangle$, the user's click on $url_k$ is presumed, and with $\langle q_j, url_k \rangle$, the user's click on $url_k$ is actual. Particular embodiments may assign $\langle q_i, url_k \rangle$ to have the same ranking score as $\langle q_j, url_k \rangle$ to reflect the presumed click-through information.

In particular embodiments, smoothing is applied to the click-through information (i.e., to each individual query chain extracted from the click-through information) (step 204) before the click features are constructed from the clickthrough information. Then, the click features are constructed from the click-through information, which includes, with respect to the search queries, both the network resources that actually have been clicked by the network users and the network resources that have been presumed to be clicked as a result of the smoothing process (step 206). This may increase the number of time-sensitive query-resource pairs used to construct the click features where the network resources have been clicked (either actual or presumed), thus increasing the quality of the click features constructed therefrom. However, smoothing is not necessary for the purpose of constructing click features. The click feature may be constructed from the click-through information without applying the smoothing process. On the other hand, experiments suggest that if smoothing is applied to the click-through information before the click features are constructed, then the recency-based ranking algorithm trained using such click features perform better than a recency-based ranking algorithm trained using click feature constructed from the click-through information without applying the smoothing process.

In particular embodiments, the click features, together with other types of training features, may be used to train a recency-based ranking algorithm via machine learning (step 208). The recency-based ranking algorithm may be any suitable machine learning algorithm. Particular embodiments use the GBrank algorithm for the ranking model learning, as GBrank is one of the most effective learning-to-rank algorithms. The basic concept of GBrank may be summarized as the following. For each preference pair of objects ⟨x, y⟩ in the available preference set $S=\{\langle x_i, y_i \rangle | x_i \succ y_i; i=1, \ldots, N\}$, x should be ranked higher than y. With the GBrank algorithm, the problem of learning ranking functions is to compute a ranking function h, such that h matches the set of preference pairs; that is, $h(x_i) \geq h(y_i)$ if $x_i \succ y_i$; $i=1, \ldots, N$ for as many preference pairs as possible. In the context of ranking network resources, a preference pair may refer to a preference pair of network resources, where one of the network resources in the preference pair is more preferred with respect to a corresponding search query than the other one of the network resources in the pair. Particular embodiments use the following loss function, $\Re(h)$, to measure the risk of a given ranking function h:

$$\Re(h) = \frac{1}{2} \sum_{i=1}^{N} (\max\{0, h(y_i) - h(x_i) + \tau\}^2);$$

where $\tau$ is the margin between two objects (e.g., two network resources) in the preference pair. To minimize the loss function, h(x) needs to be greater than h(y) with the margin $\tau$. Particular embodiments may choose $\tau$ to be a constant value that is same for all preference pairs of network resources in a set, or as a value varying with the individual preference pairs of network resources. When pair-wise judgments are extracted from the human labels associated with the query-resource pairs, the pair-wise judgments may include a grade difference for each pair of network resources, which may also be used as the value for $\tau$.

Particular embodiments may use normalized discounted cumulative gain (NDCG), which is a variant of the discounted cumulative gain (DCG) metric, to evaluate the quality of the recency-based ranking model. Particular embodiments may define NDCG as:

$$NDCG_n = Z_n \sum_{i=1}^{n} \frac{G_i}{\log_2(i+1)};$$

where i is the position in the network resource list; $G_i$ is the function of relevance grade; and $Z_n$ is the normalization factor, which is used to make the NDCG of the ideal ranked network resource list to be 1.

Once the recency-based ranking algorithm has been trained with various types of features including the click features, the recency-based ranking algorithm may be used to rank the search results for recency-sensitive search queries. In particular embodiments, when a search query is received at a search engine (step 210), the search engine may identify a set of network resources for the search query (step 212).

The network resources in the set need to be ranked before they are presented to the network user requesting the search. However, not all search queries require specialized handling in ranking their corresponding network resources to promote recent content. In fact, in some cases, retrieval performance may actually degrade when a recency-based ranking algorithm is applied to the network resources corresponding to time-insensitive search queries. Thus, particular embodiments may apply the recency-based ranking algorithm only to the network resources corresponding to those recency-sensitive search queries. For recency-insensitive search queries, particular embodiments may apply a traditional relevancy-based ranking algorithm.

Particular embodiments may determine whether the search query is recency-sensitive using, for example, the an automatic recency classifier (step 214). Automatic recency classifier is described in more detail in U.S. patent application Ser. No. 12/579,855, entitled "Incorporating Recency in Network Search Using Machine Learning", by Anlei Dong et al, filed on Oct. 15, 2009.

If the search query is recency-sensitive (step 214, "YES"), then particular embodiments may use the recency-based ranking algorithm to rank the set of network resources for the recency-sensitive search query (step 216). On the other hand, if the search query is not recency-sensitive (step 214, "NO"), then particular embodiments may apply a relevancy-based ranking algorithm to rank the set of network resources identified for the recency-insensitive search query (step 218).

Figure 3:
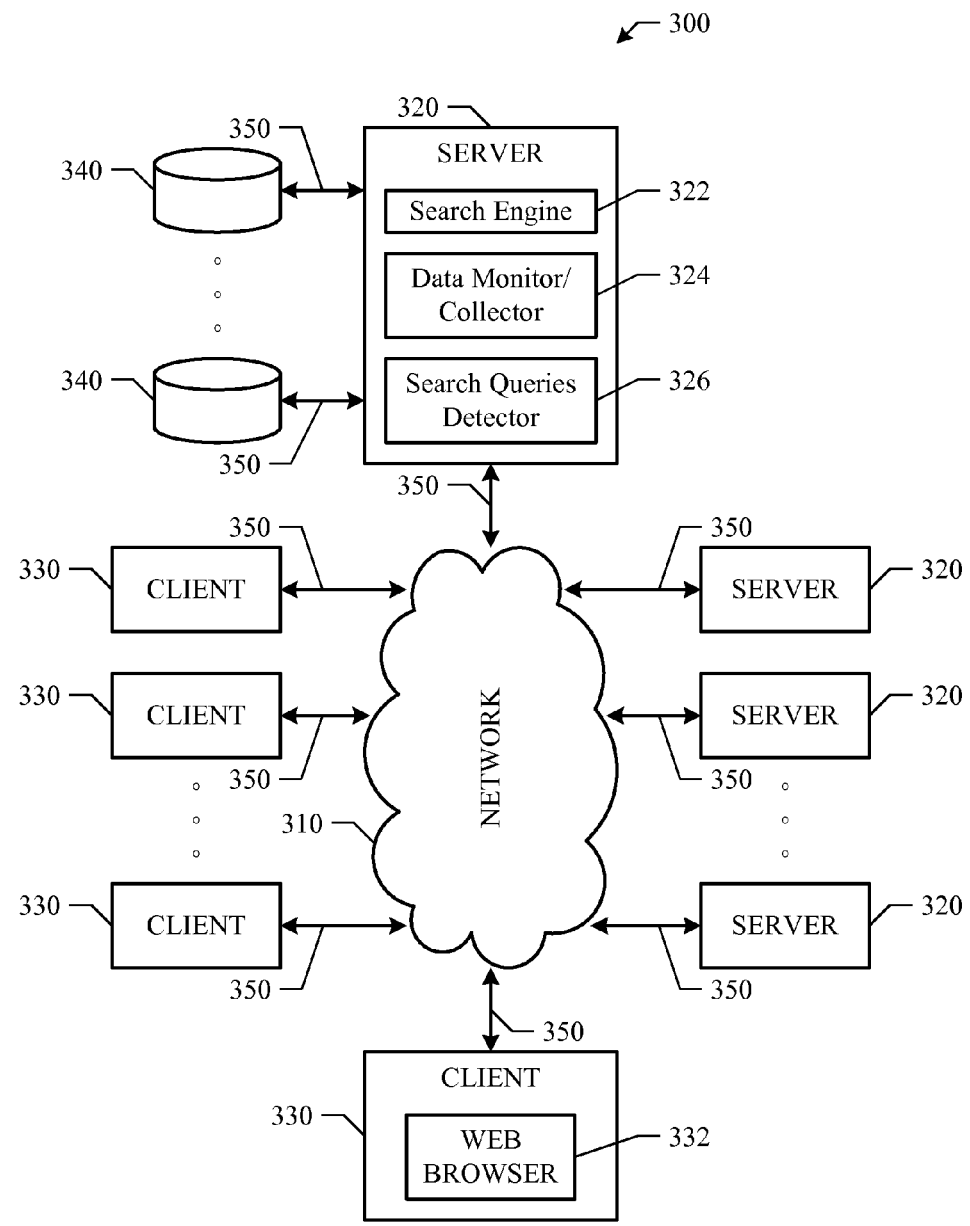
FIG. 3 illustrates an example network environment.

Particular embodiments may be implemented in a network environment. FIG. 3 illustrates an example network environment 300. Network environment 300 includes a network 310 coupling one or more servers 320 and one or more clients 330 to each other. In particular embodiments, network 310 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 310 or a combination of two or more such networks 310. The present disclosure contemplates any suitable network 310.

One or more links 350 couple servers 320 or clients 330 to network 310. In particular embodiments, one or more links 350 each includes one or more wired, wireless, or optical links 350. In particular embodiments, one or more links 350 each includes an intranet, an extranet, a VPN, a LAN, a WLAN, a WAN, a MAN, a communications network, a satellite network, a portion of the Internet, or another link 350 or a combination of two or more such links 350. The present disclosure contemplates any suitable links 350 coupling servers 320 and clients 330 to network 310.

In particular embodiments, each server 320 may be a unitary server or may be a distributed server spanning multiple computers or multiple datacenters. Servers 320 may be of various types, such as, for example and without limitation, web server, news server, mail server, message server, advertising server, file server, application server, exchange server, database server, or proxy server. In particular embodiments, each server 320 may include hardware, software, or embedded logic components or a combination of two or more such components for carrying out the appropriate functionalities implemented or supported by server 320. For example, a web server is generally capable of hosting websites containing web pages or particular elements of web pages. More specifically, a web server may host HTML files or other file types, or may dynamically create or constitute files upon a request, and communicate them to clients 330 in response to HTTP or other requests from clients 330. A mail server is generally capable of providing electronic mail services to various clients 330. A database server is generally capable of providing an interface for managing data stored in one or more data stores.

In particular embodiments, each client 330 may be an electronic device including hardware, software, or embedded logic components or a combination of two or more such components and capable of carrying out the appropriate functionalities implemented or supported by client 330. For example and without limitation, a client 330 may be a desktop computer system, a notebook computer system, a netbook computer system, a handheld electronic device, or a mobile telephone. A client 330 may enable a network user at client 330 to access network 310. A client 330 may have a web browser, such as Microsoft Internet Explorer or Mozilla Firefox, and may have one or more add-ons, plug-ins, or other extensions, such as Google Toolbar or Yahoo Toolbar. A client 330 may enable its user to communicate with other users at other clients 330. The present disclosure contemplates any suitable clients 330.

A client 330 may have a web browser 332, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 330 may enter a Uniform Resource Locator (URL) or other address directing the web browser 332 to a server 320, and the web browser 332 may generate a Hyper Text Transfer Protocol (HTTP) request and communicate the HTTP request to server 320. Server 320 may accept the HTTP request and communicate to client 330 one or more Hyper Text Markup Language (HTML) files responsive to the HTTP request. Client 330 may render a web page based on the HTML files from server 320 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

In particular embodiments, one or more data storages 340 may be communicatively linked to one or more servers 320 via one or more links 350. In particular embodiments, data storages 340 may be used to store various types of information. In particular embodiments, the information stored in data storages 340 may be organized according to specific data structures. Particular embodiments may provide interfaces that enable servers 320 or clients 330 to manage (e.g., retrieve, modify, add, or delete) the information stored in data storage 340.

In particular embodiments, a server 320 may include a search engine 322. Search engine 322 may include hardware, software, or embedded logic components or a combination of two or more such components for carrying out the appropriate functionalities implemented or supported by search engine 322. For example and without limitation, search engine 322 may implement one or more search algorithms that may be used to identify network resources in response to the search queries received at search engine 322, one or more ranking algorithms (e.g., a relevancy-based ranking algorithm and a recency-based ranking algorithm) that may be used to rank the identified network resources, one or more summarization algorithms that may be used to summarize the identified network resources, and so on. The ranking algorithms implemented by search engine 322 may be trained using the set of the training data constructed from pairs of search query and clicked URL.

In particular embodiments, a server 320 may also include a data monitor/collector 324. Data monitor/collection 324 may include hardware, software, or embedded logic components or a combination of two or more such components for carrying out the appropriate functionalities implemented or supported by data collector/collector 324. For example and without limitation, data monitor/collector 324 may monitor and collect network traffic data at server 320 and store the collected network traffic data in one or more data storage 340. The pairs of search query and clicked network resources may then be extracted from the network traffic data.

In particular embodiments, a server 320 may also include an automatic search query classifier 326. Search query classifier 326 may include hardware, software, or embedded logic components or a combination of two or more such components for carrying out the appropriate functionalities implemented or supported by Search query classifier 326. For example, search query classifier 326 may determined, for each search query received at search engine 322, whether the search query is recency-sensitive.

Figure 4:
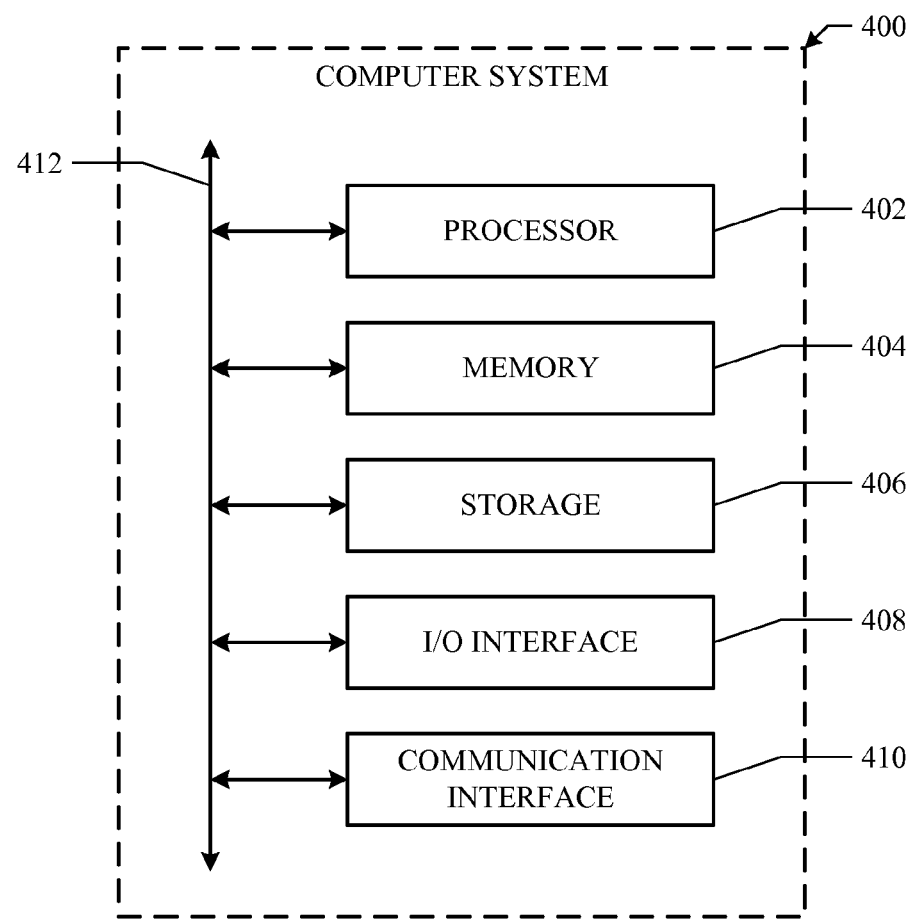
FIG. 4 illustrates an example computer system.

Particular embodiments may be implemented on one or more computer systems. FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these.

Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. The present disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. The present disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method, comprising: by one or more computing devices,
 accessing:
  one or more query-resource pairs, wherein for each one of the query-resource pairs comprising one of one or more search queries and one of one or more network resources, the one search query is recency-sensitive with respect to a particular time period, and the one network resource is identified for the one search query;
  a resource-view count associated with each one of the query-resource pairs, wherein for each one of the query-resource pairs, the resource-view count is a number of search sessions during which one of one or more network users has viewed the one network resource in connection with the one search query; and
  a resource-click count associated with each one of the query-resource pairs, wherein for each one of the query-resource pairs, the resource-click count is a number of search sessions during which one of the network users has clicked on the one network resource in connection with the one search query; and constructing one or more first click features using the resource-view counts and the resource-click counts associated with the query-resource pairs, wherein constructing one of the first click features in connection with one of the query-resource pairs comprises:
  determining a only-resource-click count associated with the one query-resource pair using the resource-click count associated with the one query-resource pair, wherein the only-resource-click count is a number of search sessions during which one of the network users has clicked only on the one network resource and none of other ones of the network resources in connection with the one search query; and
  calculating a ratio between the only-resource-click count and the resource-view count associated with the one query-resource pair as the one first click feature.

2. The method recited in claim 1, further comprising:
accessing a resource-exam count associated with each one of the query-resource pairs, wherein for each one of the query-resource pairs, the resource-exam count is a number of search sessions during which one of the network users has examined the one network resource in connection with the one search query; and constructing one or more second click features using the resource-click counts and the resource-exam counts associated with the query-resource pairs, wherein constructing one of the second click features in connection with one of the query-resource pairs comprises:
  calculating a first sum of the resource-click count and the resource-exam count associated with the one query-resource pair; and
  calculating a ratio between the resource-click count and the first sum associated with the one query-resource pair as the one second click feature.

3. The method recited in claim 2, further comprising:
constructing one or more third click features using the resource-view counts and the resource-click counts associated with the query-resource pairs, wherein constructing one of the third click features in connection with one of the query-resource pairs comprises:
  calculating a ratio between the resource-click count and the resource-view count associated with the one query-resource pair as the one third click feature; and
training a recency-based ranking algorithm using at least the first click features, the second click features, and the third click features.

4. The method recited in claim 3, further comprising:
applying a time-varying weight to the resource-view count, the resource-click count, and the resource-exam count associated with each one of the query-resource pairs, wherein for each one of the query-resource pairs:
  the resource-view count is a sum of two or more partial resource-view counts corresponding to two or more time periods, and a first one of the partial resource-view counts corresponding to a first one of the time periods weighs more than a second one of the partial resource-view counts corresponding to a second one of the time periods when calculating the resource-view count using the partial resource-view counts if the first time period is more recent than the second time period;
  the resource-click count is a sum of two or more partial resource-click counts corresponding to the time periods, and a first one of the partial resource-click counts corresponding to the first time period weighs more than a second one of the partial resource-click counts corresponding to the second time period when calculating the resource-click count using the partial resource-click counts if the first time period is more recent than the second time period; and
  the resource-exam count is a sum of two or more partial resource-exam counts corresponding to the time periods, and a first one of the partial resource-exam counts corresponding to the first time period weighs more than a second one of the partial resource-exam counts corresponding to the second time period when calculating the resource-exam count using the partial resource-exam counts if the first time period is more recent than the second time period.

5. The method recited in claim 1,
wherein the resource-click count associated with each one of the query-resource pairs is a sum of one or more partial resource-click counts associated with the query-resource pair corresponding to one or more time periods; and
further comprising constructing one or more fourth click features using the partial resource-click counts associated with the query-resource pairs, wherein constructing one or more of the fourth click features in connection with one of the query-resource pairs comprises:
  calculating an average resource-click count with respect to the time periods using the partial resource-click counts;
  calculating a click-count variance with respect to the time periods using the partial resource-click counts and the average resource-click count;
  for each one of the time periods, calculating a deviation of the partial resource-click count from the average resource-click count corresponding to the time period as one of the fourth click features.

6. The method recited in claim 1, further comprising:
accessing:
  one or more query-host pairs, wherein for each one of the query-host pairs comprising one of the search queries and one of one or more network hosts, the one search query is recency-sensitive with respect to the particular time period, and the one network host hosts one or more of the network resources identified for the one search query;
  a host-view count associated with each one of the query-host pairs, wherein for each one of the query-host pairs, the host-view count is a number of search sessions during which one of the network users has viewed the one network host in connection with the one search query;
  a host-click count associated with each one of the query-host pairs, wherein for each one of the query-host pairs, the host-click count is a number of search sessions during which one of the network users has clicked on the one network host in connection with the one search query; and
  a host-exam count associated with each one of the query-host pairs, wherein for each one of the query-host pairs, the host-exam count is a number of search sessions during which one of the network users has examined the one network host in connection with the one search query;
constructing one or more fifth click features using the host-view counts and the host-click counts associated with the query-host pairs, wherein constructing one of the fifth click features in connection with one of the query-host pairs comprises:
  determining a only-host-click count associated with the one query-host pair using the host-click count associated with the one query-host pair, wherein the only-host-click count is a number of search sessions during which one of the network users has clicked only on the one network host and none of other ones of the network hosts in connection with the one search query; and
  calculating a ratio between the only-host-click count and the host-view count associated with the one query-host pair as the one fifth click feature;
constructing one or more sixth click features using the host-click counts and the host-exam counts associated with the query-host pairs, wherein constructing one of the sixth click features in connection with one of the query-host pairs comprises:
  calculating a second sum of the host-click count and the host-exam count associated with the one query-host pair; and
  calculating a ratio between the host-click count and the second sum associated with the one query-host pair as the one sixth click feature; and
constructing one or more seventh click features using the host-view counts and the host-click counts associated with the query-host pairs, wherein constructing one of the seventh click features in connection with one of the query-host pairs comprises:
  calculating a ratio between the host-click count and the host-view count associated with the one query-host pair as the one seventh click feature.

7. The method recited in claim 6, further comprising:
applying the time-varying weight to the host-view count, the host-click count, and the host-exam count associated with each one of the query-host pairs, wherein for each one of the query-host pairs:
  the host-view count is a sum of two or more partial host-view counts corresponding to two or more time periods, and a first one of the partial host-view counts corresponding to a first one of the time periods weighs more than a second one of the partial host-view counts corresponding to a second one of the time periods when calculating the host-view count using the partial host-view counts if the first time period is more recent than the second time period;
  the host-click count is a sum of two or more partial host-click counts corresponding to the time periods, and a first one of the partial host-click counts corresponding to the first time period weighs more than a second one of the partial host-click counts corresponding to the second time period when calculating the host-click count using the partial host-click counts if the first time period is more recent than the second time period; and
  the host-exam count is a sum of two or more partial host-exam counts corresponding to the time periods, and a first one of the partial host-exam counts corresponding to the first time period weighs more than a second one of the partial host-exam counts corresponding to the second time period when calculating the host-exam count using the partial host-exam counts if the first time period is more recent than the second time period.

8. A system, comprising:
a memory comprising instructions executable by one or more processors; and
one or more processors coupled to the memory and operable to execute the instructions, the one or more processors being operable when executing the instructions to:
  access:
    one or more query-resource pairs, wherein for each one of the query-resource pairs comprising one of one or more search queries and one of one or more network resources, the one search query is recency-sensitive with respect to a particular time period, and the one network resource is identified for the one search query;
    a resource-view count associated with each one of the query-resource pairs, wherein for each one of the query-resource pairs, the resource-view count is a number of search sessions during which one of one or more network users has viewed the one network resource in connection with the one search query; and
    a resource-click count associated with each one of the query-resource pairs, wherein for each one of the query-resource pairs, the resource-click count is a number of search sessions during which one of the network users has clicked on the one network resource in connection with the one search query; and
  construct one or more first click features using the resource-view counts and the resource-click counts associated with the query-resource pairs, wherein to construct one of the first click features in connection with one of the query-resource pairs comprises:
    determine a only-resource-click count associated with the one query-resource pair using the resource-click count associated with the one query-resource pair, wherein the only-resource-click count is a number of search sessions during which one of the network users has clicked only on the one network resource and none of other ones of the network resources in connection with the one search query; and
    calculate a ratio between the only-resource-click count and the resource-view count associated with the one query-resource pair as the one first click feature.

9. The system recited in claim 8, wherein the one or more processors are further operable when executing the instructions to:
access a resource-exam count associated with each one of the query-resource pairs, wherein for each one of the query-resource pairs, the resource-exam count is a number of search sessions during which one of the network users has examined the one network resource in connection with the one search query; and
construct one or more second click features using the resource-click counts and the resource-exam counts associated with the query-resource pairs, wherein to construct one of the second click features in connection with one of the query-resource pairs comprises:
  calculate a first sum of the resource-click count and the resource-exam count associated with the one query-resource pair; and
  calculate a ratio between the resource-click count and the first sum associated with the one query-resource pair as the one second click feature.

10. The system recited in claim 9, wherein the one or more processors are further operable when executing the instructions to:

construct one or more third click features using the resource-view counts and the resource-click counts associated with the query-resource pairs, wherein to construct one of the third click features in connection with one of the query-resource pairs comprises:
calculate a ratio between the resource-click count and the resource-view count associated with the one query-resource pair as the one third click feature; and
train a recency-based ranking algorithm using at least the first click features, the second click features, and the third click features.

11. The system recited in claim 10, wherein the one or more processors are further operable when executing the instructions to:
apply a time-varying weight to the resource-view count, the resource-click count, and the resource-exam count associated with each one of the query-resource pairs, wherein for each one of the query-resource pairs:
the resource-view count is a sum of two or more partial resource-view counts corresponding to two or more time periods, and a first one of the partial resource-view counts corresponding to a first one of the time periods weighs more than a second one of the partial resource-view counts corresponding to a second one of the time periods when calculating the resource-view count using the partial resource-view counts if the first time period is more recent than the second time period;
the resource-click count is a sum of two or more partial resource-click counts corresponding to the time periods, and a first one of the partial resource-click counts corresponding to the first time period weighs more than a second one of the partial resource-click counts corresponding to the second time period when calculating the resource-click count using the partial resource-click counts if the first time period is more recent than the second time period; and
the resource-exam count is a sum of two or more partial resource-exam counts corresponding to the time periods, and a first one of the partial resource-exam counts corresponding to the first time period weighs more than a second one of the partial resource-exam counts corresponding to the second time period when calculating the resource-exam count using the partial resource-exam counts if the first time period is more recent than the second time period.

12. The system recited in claim 8,
wherein the resource-click count associated with each one of the query-resource pairs is a sum of one or more partial resource-click counts associated with the query-resource pair corresponding to one or more time periods; and
the one or more processors are further operable when executing the instructions to construct one or more fourth click features using the partial resource-click counts associated with the query-resource pairs, wherein to construct one or more of the fourth click features in connection with one of the query-resource pairs comprises:
calculate an average resource-click count with respect to the time periods using the partial resource-click counts;
calculate a click-count variance with respect to the time periods using the partial resource-click counts and the average resource-click count;
for each one of the time periods, calculate a deviation of the partial resource-click count from the average resource-click count corresponding to the time period as one of the fourth click features.

13. The system recited in claim 8, wherein the one or more processors are further operable when executing the instructions to:
access:
one or more query-host pairs, wherein for each one of the query-host pairs comprising one of the search queries and one of one or more network hosts, the one search query is recency-sensitive with respect to the particular time period, and the one network host hosts one or more of the network resources identified for the one search query;
a host-view count associated with each one of the query-host pairs, wherein for each one of the query-host pairs, the host-view count is a number of search sessions during which one of the network users has viewed the one network host in connection with the one search query;
a host-click count associated with each one of the query-host pairs, wherein for each one of the query-host pairs, the host-click count is a number of search sessions during which one of the network users has clicked on the one network host in connection with the one search query; and
a host-exam count associated with each one of the query-host pairs, wherein for each one of the query-host pairs, the host-exam count is a number of search sessions during which one of the network users has examined the one network host in connection with the one search query;
construct one or more fifth click features using the host-view counts and the host-click counts associated with the query-host pairs, wherein to construct one of the fifth click features in connection with one of the query-host pairs comprises:
determine a only-host-click count associated with the one query-host pair using the host-click count associated with the one query-host pair, wherein the only-host-click count is a number of search sessions during which one of the network users has clicked only on the one network host and none of other ones of the network hosts in connection with the one search query; and
calculate a ratio between the only-host-click count and the host-view count associated with the one query-host pair as the one fifth click feature;
construct one or more sixth click features using the host-click counts and the host-exam counts associated with the query-host pairs, wherein to construct one of the sixth click features in connection with one of the query-host pairs comprises:
calculate a second sum of the host-click count and the host-exam count associated with the one query-host pair; and
calculate a ratio between the host-click count and the second sum associated with the one query-host pair as the one sixth click feature; and
construct one or more seventh click features using the host-view counts and the host-click counts associated with the query-host pairs, wherein to construct one of the seventh click features in connection with one of the query-host pairs comprises:
calculate a ratio between the host-click count and the host-view count associated with the one query-host pair as the one seventh click feature.

14. The system recited in claim 13, wherein the one or more processors are further operable when executing the instructions to:
apply the time-varying weight to the host-view count, the host-click count, and the host-exam count associated with each one of the query-host pairs, wherein for each one of the query-host pairs:
the host-view count is a sum of two or more partial host-view counts corresponding to two or more time periods, and a first one of the partial host-view counts corresponding to a first one of the time periods weighs more than a second one of the partial host-view counts corresponding to a second one of the time periods when calculating the host-view count using the partial host-view counts if the first time period is more recent than the second time period;
the host-click count is a sum of two or more partial host-click counts corresponding to the time periods, and a first one of the partial host-click counts corresponding to the first time period weighs more than a second one of the partial host-click counts corresponding to the second time period when calculating the host-click count using the partial host-click counts if the first time period is more recent than the second time period; and
the host-exam count is a sum of two or more partial host-exam counts corresponding to the time periods, and a first one of the partial host-exam counts corresponding to the first time period weighs more than a second one of the partial host-exam counts corresponding to the second time period when calculating the host-exam count using the partial host-exam counts if the first time period is more recent than the second time period.

15. One or more computer-readable tangible storage media embodying software operable when executed by one or more computer systems to:
access:
one or more query-resource pairs, wherein for each one of the query-resource pairs comprising one of one or more search queries and one of one or more network resources, the one search query is recency-sensitive with respect to a particular time period, and the one network resource is identified for the one search query;
a resource-view count associated with each one of the query-resource pairs, wherein for each one of the query-resource pairs, the resource-view count is a number of search sessions during which one of one or more network users has viewed the one network resource in connection with the one search query; and
a resource-click count associated with each one of the query-resource pairs, wherein for each one of the query-resource pairs, the resource-click count is a number of search sessions during which one of the network users has clicked on the one network resource in connection with the one search query; and
construct one or more first click features using the resource-view counts and the resource-click counts associated with the query-resource pairs, wherein to construct one of the first click features in connection with one of the query-resource pairs comprises:
determine a only-resource-click count associated with the one query-resource pair using the resource-click count associated with the one query-resource pair, wherein the only-resource-click count is a number of search sessions during which one of the network users has clicked only on the one network resource and none of other ones of the network resources in connection with the one search query; and
calculate a ratio between the only-resource-click count and the resource-view count associated with the one query-resource pair as the one first click feature.

16. The media recited in claim 15, wherein the software is further operable when executed by the one or more computer systems to:
access a resource-exam count associated with each one of the query-resource pairs, wherein for each one of the query-resource pairs, the resource-exam count is a number of search sessions during which one of the network users has examined the one network resource in connection with the one search query; and
construct one or more second click features using the resource-click counts and the resource-exam counts associated with the query-resource pairs, wherein to construct one of the second click features in connection with one of the query-resource pairs comprises:
calculate a first sum of the resource-click count and the resource-exam count associated with the one query-resource pair; and
calculate a ratio between the resource-click count and the first sum associated with the one query-resource pair as the one second click feature.

17. The media recited in claim 16, wherein the software is further operable when executed by the one or more computer systems to:
construct one or more third click features using the resource-view counts and the resource-click counts associated with the query-resource pairs, wherein to construct one of the third click features in connection with one of the query-resource pairs comprises:
calculate a ratio between the resource-click count and the resource-view count associated with the one query-resource pair as the one third click feature; and
train a recency-based ranking algorithm using at least the first click features, the second click features, and the third click features.

18. The media recited in claim 17, wherein the software is further operable when executed by the one or more computer systems to:
apply a time-varying weight to the resource-view count, the resource-click count, and the resource-exam count associated with each one of the query-resource pairs, wherein for each one of the query-resource pairs:
the resource-view count is a sum of two or more partial resource-view counts corresponding to two or more time periods, and a first one of the partial resource-view counts corresponding to a first one of the time periods weighs more than a second one of the partial resource-view counts corresponding to a second one of the time periods when calculating the resource-view count using the partial resource-view counts if the first time period is more recent than the second time period;
the resource-click count is a sum of two or more partial resource-click counts corresponding to the time periods, and a first one of the partial resource-click counts corresponding to the first time period weighs more than a second one of the partial resource-click counts corresponding to the second time period when calculating the resource-click count using the partial resource-click counts if the first time period is more recent than the second time period; and the resource-exam count is a sum of two or more partial resource-exam counts corresponding to the time periods, and a first one of the partial resource-exam counts corresponding to the first time period weighs more than a second one of the partial resource-exam counts corresponding to the second time period when calculating the resource-exam count using the partial resource-exam counts if the first time period is more recent than the second time period.

19. The media recited in claim 15,
wherein the resource-click count associated with each one of the query-resource pairs is a sum of one or more partial resource-click counts associated with the query-resource pair corresponding to one or more time periods; and
the software is further operable when executed by the one or more computer systems to construct one or more fourth click features using the partial resource-click counts associated with the query-resource pairs, wherein to construct one or more of the fourth click features in connection with one of the query-resource pairs comprises:
calculate an average resource-click count with respect to the time periods using the partial resource-click counts;
calculate a click-count variance with respect to the time periods using the partial resource-click counts and the average resource-click count;
for each one of the time periods, calculate a deviation of the partial resource-click count from the average resource-click count corresponding to the time period as one of the fourth click features.

20. The media recited in claim 15, wherein the software is further operable when executed by the one or more computer systems to:
access:
one or more query-host pairs, wherein for each one of the query-host pairs comprising one of the search queries and one of one or more network hosts, the one search query is recency-sensitive with respect to the particular time period, and the one network host hosts one or more of the network resources identified for the one search query;
a host-view count associated with each one of the query-host pairs, wherein for each one of the query-host pairs, the host-view count is a number of search sessions during which one of the network users has viewed the one network host in connection with the one search query;
a host-click count associated with each one of the query-host pairs, wherein for each one of the query-host pairs, the host-click count is a number of search sessions during which one of the network users has clicked on the one network host in connection with the one search query; and
a host-exam count associated with each one of the query-host pairs, wherein for each one of the query-host pairs, the host-exam count is a number of search sessions during which one of the network users has examined the one network host in connection with the one search query;
construct one or more fifth click features using the host-view counts and the host-click counts associated with the query-host pairs, wherein to construct one of the fifth click features in connection with one of the query-host pairs comprises:
determine a only-host-click count associated with the one query-host pair using the host-click count associated with the one query-host pair, wherein the only-host-click count is a number of search sessions during which one of the network users has clicked only on the one network host and none of other ones of the network hosts in connection with the one search query; and
calculate a ratio between the only-host-click count and the host-view count associated with the one query-host pair as the one fifth click feature;
construct one or more sixth click features using the host-click counts and the host-exam counts associated with the query-host pairs, wherein to construct one of the sixth click features in connection with one of the query-host pairs comprises:
calculate a second sum of the host-click count and the host-exam count associated with the one query-host pair; and
calculate a ratio between the host-click count and the second sum associated with the one query-host pair as the one sixth click feature; and
construct one or more seventh click features using the host-view counts and the host-click counts associated with the query-host pairs, wherein to construct one of the seventh click features in connection with one of the query-host pairs comprises:
calculate a ratio between the host-click count and the host-view count associated with the one query-host pair as the one seventh click feature.

21. The media recited in claim 20, wherein the software is further operable when executed by the one or more computer systems to:
apply the time-varying weight to the host-view count, the host-click count, and the host-exam count associated with each one of the query-host pairs, wherein for each one of the query-host pairs:
the host-view count is a sum of two or more partial host-view counts corresponding to two or more time periods, and a first one of the partial host-view counts corresponding to a first one of the time periods weighs more than a second one of the partial host-view counts corresponding to a second one of the time periods when calculating the host-view count using the partial host-view counts if the first time period is more recent than the second time period;
the host-click count is a sum of two or more partial host-click counts corresponding to the time periods, and a first one of the partial host-click counts corresponding to the first time period weighs more than a second one of the partial host-click counts corresponding to the second time period when calculating the host-click count using the partial host-click counts if the first time period is more recent than the second time period; and
the host-exam count is a sum of two or more partial host-exam counts corresponding to the time periods, and a first one of the partial host-exam counts corresponding to the first time period weighs more than a second one of the partial host-exam counts corresponding to the second time period when calculating the host-exam count using the partial host-exam counts if the first time period is more recent than the second time period.

* * * * *